United States Patent [19]
Dillmann

[11] Patent Number: 5,110,535
[45] Date of Patent: May 5, 1992

[54] TURBINE-DRIVEN CONTROL ROD DRIVE

[75] Inventor: Charles W. Dillmann, Morgan Hill, Calif.

[73] Assignee: General Electric Company, San Jose, Calif.

[21] Appl. No.: 667,798

[22] Filed: Mar. 11, 1991

Related U.S. Application Data

[63] Continuation-in-part of Ser. No. 553,073, Jul. 10, 1990.

[51] Int. Cl.⁵ ............................................. G21C 7/16
[52] U.S. Cl. .................................. 376/230; 376/231; 376/233
[58] Field of Search ............... 376/230, 231, 232, 226, 376/219, 233

[56] References Cited

U.S. PATENT DOCUMENTS

| | | | |
|---|---|---|---|
| 3,785,923 | 1/1974 | Bratoljic et al. | 376/227 |
| 3,945,514 | 3/1976 | Dose | 214/27 |
| 3,957,577 | 5/1976 | Treshow | 376/230 |
| 4,030,972 | 6/1977 | Groves | 376/230 |
| 4,238,288 | 12/1980 | Anikin et al. | 376/232 |
| 4,423,002 | 12/1983 | Wiart et al. | 376/227 |
| 4,624,825 | 11/1986 | Martin et al. | 376/227 |
| 4,624,826 | 11/1986 | Cearley et al. | 376/327 |
| 5,034,184 | 7/1991 | Stevens et al. | 376/231 |

FOREIGN PATENT DOCUMENTS 1129631  5/1962  Fed. Rep. of Germany ...... 376/231

OTHER PUBLICATIONS

Wilkins et al, Advanced BWR: Design Improvements Build on Proven Technology, Nuclear Engineering International, reprint Jun. 1986, pp. 1-7 and drawing entitled "The World's Reactors No. 89".

Westinghouse Electric Corp., (G. Masche), "3.2 Control Rod Drive Mechanisms," Systems Summary of a Westinghouse Pressurized Water Reactor Nuclear Power Plant, 1971, pages: cover and three following pages, pp. 47-51 and FIG. 2—2.

General Electric Company (GE), BWR/6 Operating Fundamentals, "The Control Rod and Control Rod Drive Mechanism," pp. 1-11, Table 1, FIGS. 1-4; Control Rod Drive Hydraulic System, pp. 1-9 and FIGS 1-3, undated, provided to GE Customer more than one year ago.

Primary Examiner—Brooks H. Hunt
Assistant Examiner—Frederick H. Voss
Attorney, Agent, or Firm—Robert R. Schroeder

[57] ABSTRACT

A drive for positioning a control rod in a nuclear reactor core is disclosed. The drive includes a turbine rotor joined to a hollow spindle in a housing. The spindle has a piston disposed therein and a piston rod extending therefrom and through a bottom end of the spindle for being joined to the control rod. A pressurized fluid is provided into the spindle for exerting a pressure force against the piston for moving the piston for selectively gripping the control rod. Interruption of the pressurized fluid to the spindle causes ungripping of the control rod.

13 Claims, 6 Drawing Sheets

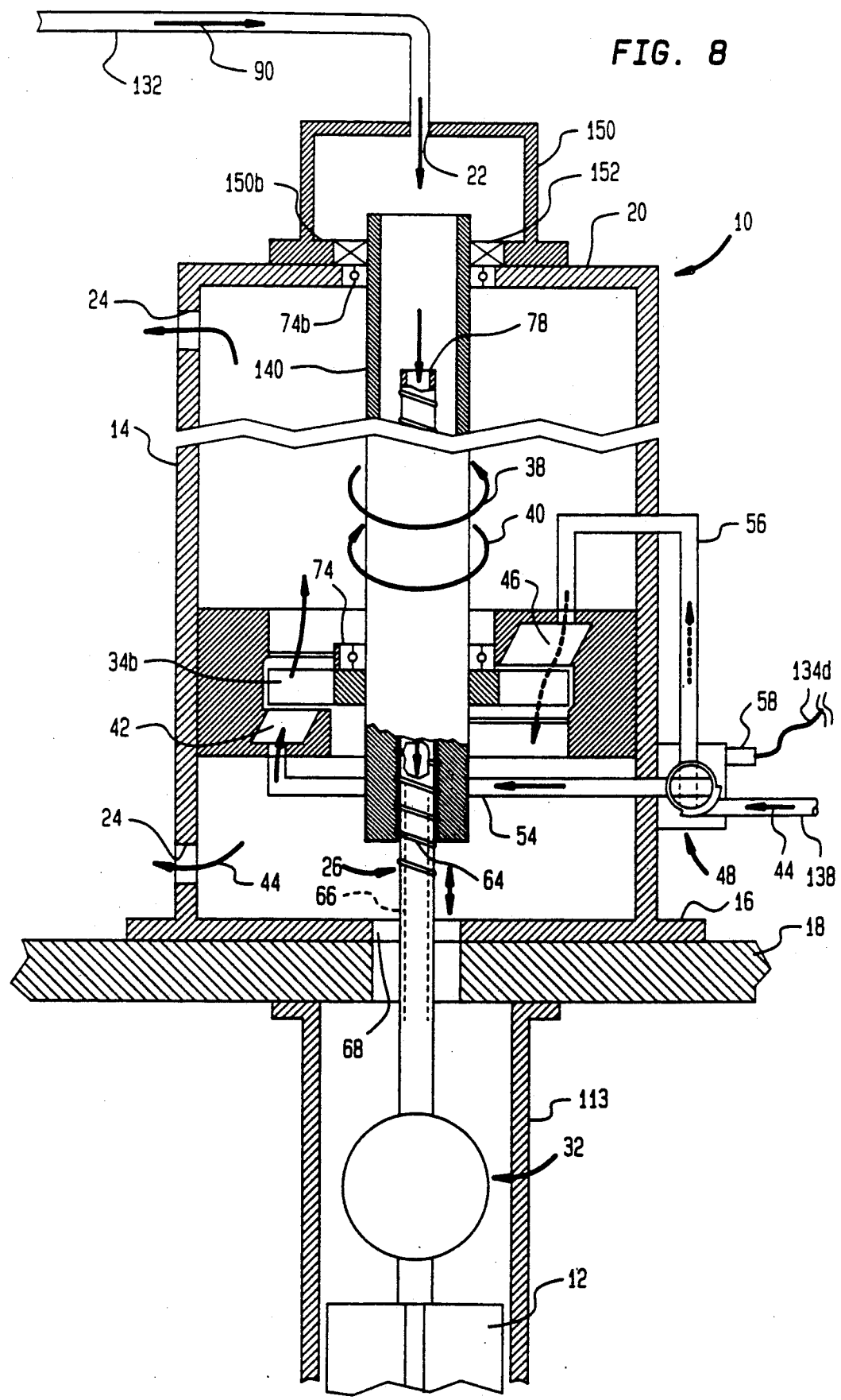

TURBINE-DRIVEN CONTROL ROD DRIVE

CROSS REFERENCE TO RELATED APPLICATION

This is a continuation-in-part of application Ser. No. 07/553,073, filed Jul. 10, 1990.

TECHNICAL FIELD

The present invention relates generally to a boiling water reactor (BWR), and, more specifically, to a drive for positioning a control rod within the reactor core thereof.

BACKGROUND ART

A conventional boiling water reactor includes a reactor pressure vessel within which is disposed a nuclear reactor core having a plurality of fuel bundles. The core is effective for generating heat released from nuclear reactions for boiling water contained in the vessel for generating steam to power a steam turbine for driving, for example, an electrical generator for providing power to a utility grid. The reactor core typically includes a plurality of control rods which are selectively inserted and withdrawn therefrom by conventional control rod drives (CRDs) for controlling the nuclear reaction rate within the core. A typical nuclear reactor includes a substantial number of control rods and corresponding control rod drives, for example, over 200 of each. The control rod drives are typically mounted externally of the vessel at either the upper of lower closure head of the vessel and have push rods which extend through the vessel and into the reactor core. Conventional control rod drives either function hydraulically or electro-mechanically for positioning the control rods within the reactor core.

In both the top and bottom mounted control rod drives described above, relatively large apertures through the reactor pressure vessel are required by the drives for translating the control rods, and, therefore, require suitable sealing to prevent leakage of the high pressure water contained in the vessel. Furthermore, bottom mounted CRDs are disposed below the reactor core which complicates maintenance procedures for preventing leakage or draining of the water from the vessel when individual CRDs are removed during maintenance.

Bottom mounted CRDs also require increased servicing area below the vessel which necessarily requires a taller containment building, and attendant increased cost. Since the number of conventional CRDs typically is greater than about 200, the area under the vessel is relatively congested, and requires suitable access areas for required maintenance operations. Conventional recirculation pumps also typically extend from the bottom of the vessel adjacent to the CRDs, which additionally congest the area under the vessel.

On the other hand, top mounted CRDs present the additional problem that all of the service lines to the CRDs must be disconnected and removed prior to removal of the CRDs, and of the upper closure head of the pressure vessel, during maintenance operations which require the removal thereof.

Conventional CRDs also require the ability for obtaining relatively fast insertion of the control rods during a scram condition, which is typically provided by a high pressure accumulator which injects a high pressure driving fluid into the CRDs for quickly inserting the control rods. In the case of bottom mounted CRDs, the scram operation occurs against the force of gravity.

OBJECTS OF THE INVENTION

Accordingly, one object of the present invention is to provide a new and improved control rod drive.

Another object of the present invention is to provide a control rod drive which is relatively simple and has few operating components.

Another object of the present invention is to provide a control rod drive which may be contained totally within a reactor pressure vessel and provided with a driving fluid from outside the pressure vessel.

Another object of the present invention is to provide a control rod drive having a scram capability provided by gravity.

DISCLOSURE OF INVENTION

A drive for positioning a control rod in a nuclear reactor core is disclosed. The drive includes a turbine rotor joined to a hollow spindle in a housing. The spindle has a piston disposed therein and a piston rod extending therefrom and through a bottom end of the spindle for being joined to the control rod. A pressurized fluid is provided into the spindle for exerting a pressure force against the piston for moving the piston for selectively gripping the control rod. Interruption of the pressurized fluid to the spindle causes ungripping of the control rod.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 8 is a schematic longitudinal sectional view of the control rod drive illustrated in FIG. 2 in accordance with an alternate embodiment of the present invention.

MODE(S) FOR CARRYING OUT THE INVENTION

Figure 1:
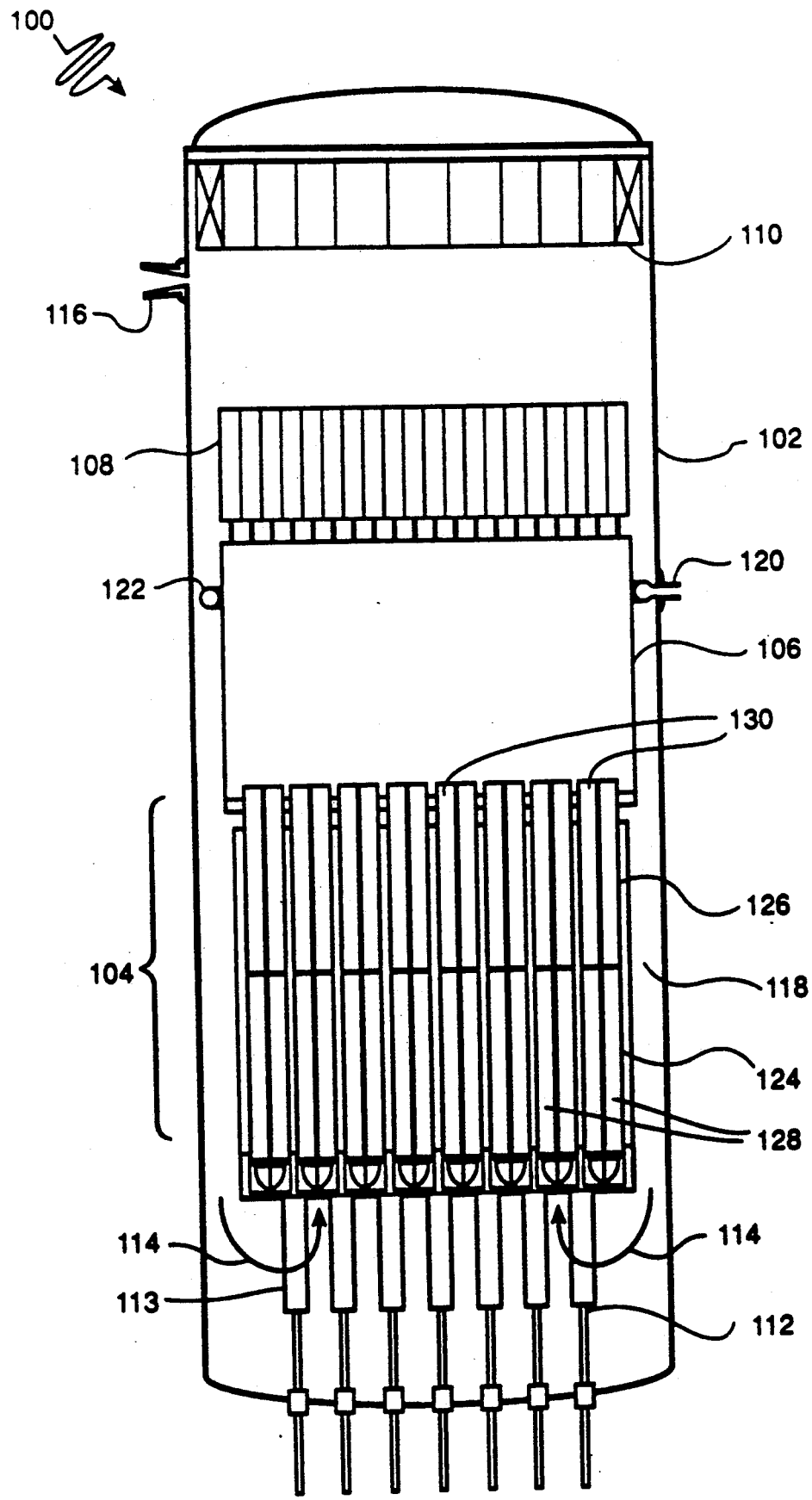
FIG. 1 is a schematic elevational sectional view of an exemplary nuclear reactor in accordance with one embodiment of the present invention.

As illustrated in FIG. 1, an exemplary, natural circulation boiling water reactor 100 comprises a pressure vessel 102, a core 104, a chimney 106, a steam separator 108, and a steam dryer 110. In one embodiment of the present invention, control rod drive housings 112 extend through the bottom of the vessel 102 and support control rod guide tubes 113. The control rod guide tubes 113 extend to the bottom of the core 104 so that control blades therein can be inserted into and retracted from the core 104 to control its power output.

Water flows, as indicated by arrows 114, into the core 104 from below. This subcooled, pressurized water is boiled within the core 104 to yield a water/steam mixture which rises through the chimney 106. The steam separator 108 helps separate steam from water, and the released steam exits through a steam exit 116 near the top of the vessel 102. Before exiting, any remaining water entrained in the steam is removed by the dryer 110. The separated water is returned down peripheral downcomer 118 by the force of gravity. Feedwater enters the vessel 102 through a feedwater inlet nozzle 120 and feedwater sparger 122 to replenish and to help cool the recirculating water in the downcomer 118.

The core 104 comprises a lower fuel matrix 124 and an upper fuel matrix 126. The upper fuel matrix 126 is filled with upwardly oriented fuel bundles 130, and the lower fuel matrix 124 is filled with downwardly oriented fuel bundles 128. Spaces are left between groups of four adjacent fuel bundles for control rods having cruciform cross sections to move vertically to regulate power output.

Figure 2:
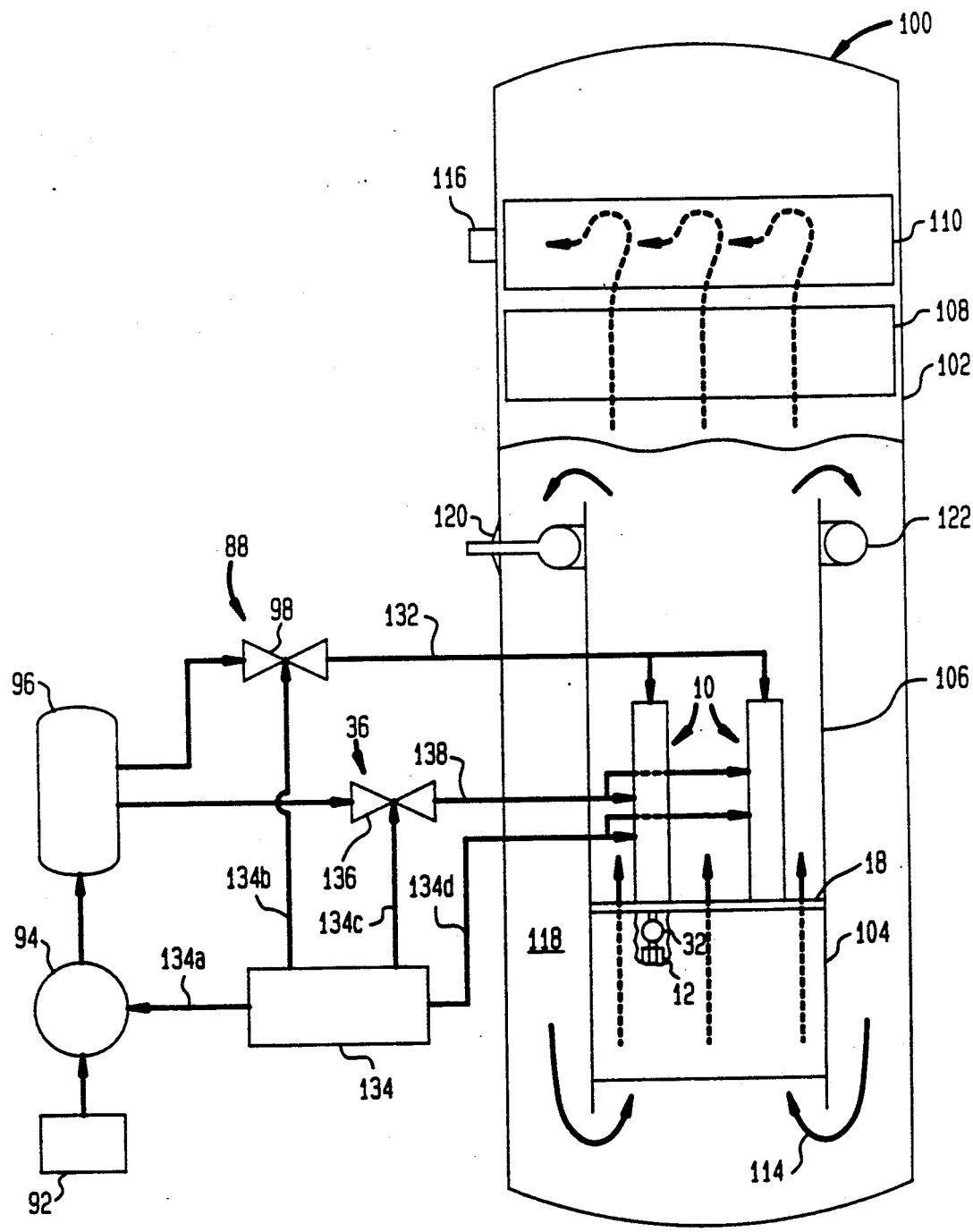
FIG. 2 is a schematic elevational sectional view of the reactor illustrated in FIG. 1 having a control rod drive in accordance with an alternate embodiment of the present invention.

Illustrated in FIG. 2 is a schematic representation of the reactor 100 having a plurality of hydraulic, preferably water powered, drives 10 each for positioning a respective conventional control rod or blade 12 in the reactor core 104 for controlling the power output thereof. Although only two control rod drives (CRDs) 10 are illustrated in FIG. 2, it is to be understood that they are representative of a substantial number of CRDs 10, which, for one embodiment of the invention, include about 200 CRDs 10.

In the preferred embodiment of the present invention, all moving components for translating the control rods 12 are disposed vertically above the core 104 and wholly within the vessel 102, which is in contrast to the embodiment of the invention illustrated in FIG. 1 wherein the control rod drive housings 112 are disposed below the core 104 and penetrate the lower enclosure head of the vessel 102. However, the description hereinbelow for the preferred CRDs 10 mounted above the core 104 is equally applicable to such CRDs 10 mounted upsidedown in the vessel 102 below the core 104, although all of the objectives available for mounting the CRDs 10 above the core 104 may not be obtained in that embodiment.

Furthermore, although the CRDs 10 are preferably mounted wholly within the vessel 102 above the core 104, they may also be mounted below the core 104 either wholly within the vessel 102 or penetrating the lower enclosure head of the vessel 102 as illustrated in FIG. 1.

In a preferred embodiment, the CRD 10 is a turbine-driven control rod drive. The blades 12 are moved by a lead screw, which can be a concentric double screw to reduce vertical height. The lead screw is driven by a water powered turbine which is driven by a source of clean deionized or demineralized water. The lead screw engages the blade 12 with a hydraulically latched collet that releases the blade 12, on loss of hydraulic pressure, causing it to drop by gravity for scram purposes.

Figure 3:
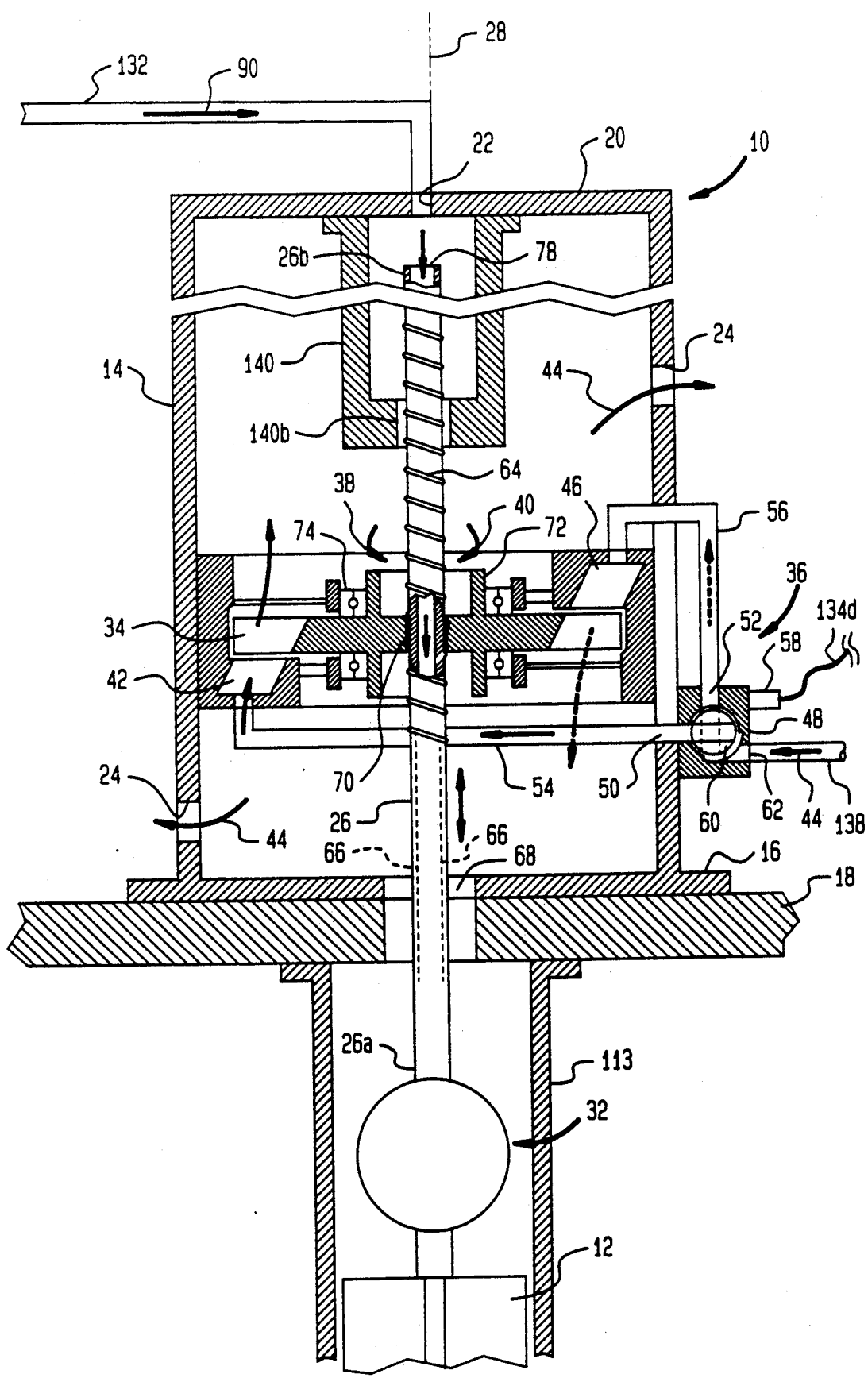
FIG. 3 is an enlarged longitudinal sectional view of one of the control rod drives illustrated in FIG. 2.
Figure 4:
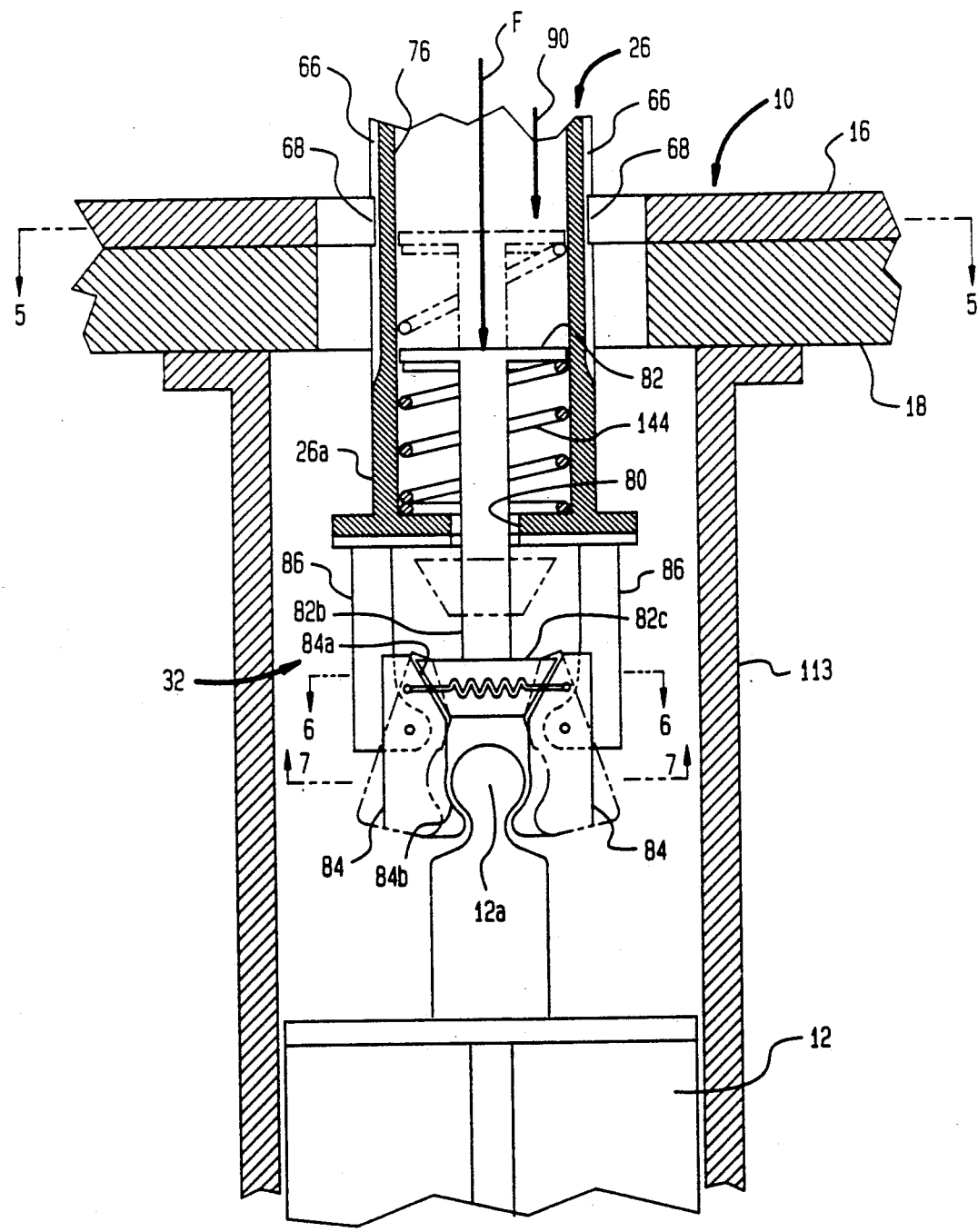
FIG. 4 is an enlarged longitudinal sectional view of the coupling means at the bottom end of the control rod drive illustrated in FIG. 3.

More specifically, illustrated in FIGS. 3 and 4 is an exemplary embodiment of one of the CRDs 10 shown in FIG. 2. The CRD 10 includes a stationary, elongate, tubular housing 14 having a proximal, or base, end 16 conventionally fixedly joined to the top of the core 104, for example by being bolted to a conventional top guide plate 18 thereof. The housing 14 preferably extends vertically upwardly from the proximal end 16 and has a distal, or top, end 20. A fluid inlet 22 is preferably located at the top of the housing 14 through the top end 16. A plurality of fluid outlets 24 are preferably disposed through sidewalls of the housing 14. The fluid outlets 24 are preferably disposed in direct flow communication with the vessel 102 for discharge therein, or may, alternatively, be joined to a conduit extending through the vessel 102 for discharge outside the vessel 102.

Mounted inside the housing 14 for axially slidable translation therein, is a lead screw, or spindle, 26 disposed coaxially about a longitudinal centerline axis 28 of the CRD 10. The spindle 26 extends downwardly through the housing proximal end 16 and into the core 104. The spindle 26 is selectively joined to the control rod 12 within a conventional control rod guide tube 113 for providing axial translation movement of the control rod 12 upon axial translation movement of the spindle 26 in the housing 14.

More specifically, coupling means represented schematically at 32 are joined to a bottom end 26a of the spindle 26 for selectively gripping the control rod 12 at a top spherical end 12a for translation movement of the control rod 12 with the spindle 26 for inserting and withdrawing the control rod 12 into and from the core 104, and for ungripping the control rod 12 at its spherical end 12a to allow gravity to insert the control rod 12 into the core 104 by the dropping thereof.

A water-driven turbine rotor 34 is operatively joined to the spindle 26 within the housing 14 for translating the spindle 26 upon rotation of the rotor 34. Means 36 are provided for selectively rotating the rotor 34 in a first, clockwise, direction as indicated by arrow 38, and in a second, counterclockwise direction as indicated by arrow 40. In a preferred embodiment of the present invention, the rotating means 36 are disposed inside the pressure vessel 102 in contact with the pressurized water 114 being circulated therein.

In the embodiment illustrated in FIG. 3, the rotating means 36 comprise a conventional first turbine nozzle 42 conventionally configured relative to the rotor 34 for selectively channeling a pressurized driving fluid 44 through the blades of the rotor 34 for rotating the rotor 34 in the first direction 38. A conventional, second turbine nozzle 46 is conventionally configured relative to the rotor 34 for selectively channeling the driving fluid 44 through the blades of the rotor 34 for rotating the rotor 34 in the second direction 40. A conventional, selectively operable valve 48 is suitably joined to the housing 14, or may be mounted outside the vessel 102, for selectively channeling the driving fluid 44 to one of a first outlet 50 and a second outlet 52 thereof. A first fluid conduit 54 is conventionally joined in flow communication with the first nozzle 42 and the first valve outlet 50. A second fluid conduit 56 is suitably joined in flow communication with the second nozzle 46 and the second valve outlet 52 through the sidewall of the housing 14. The valve 48 includes a conventional electrical actuator 58 for rotating an internal valve body 60 for selectively joining an inlet 62 of the valve 48 in flow communication with either the first outlet 50 or the second outlet 52. When the driving fluid 44 is channeled through the first nozzle 42 and against the blades of the rotor 34, the rotor 34 rotates in the first direction 38 for translating the spindle 26 downwardly for inserting the control rod 12 into the core 104. When the fluid 44 is channeled to the second nozzle 46 and against the blades of the rotor 34, the rotor 34 is rotated in the second direction 40 for translating upwardly the spindle 26 for withdrawing the control rod 12 from the core 104.

Figure 5:
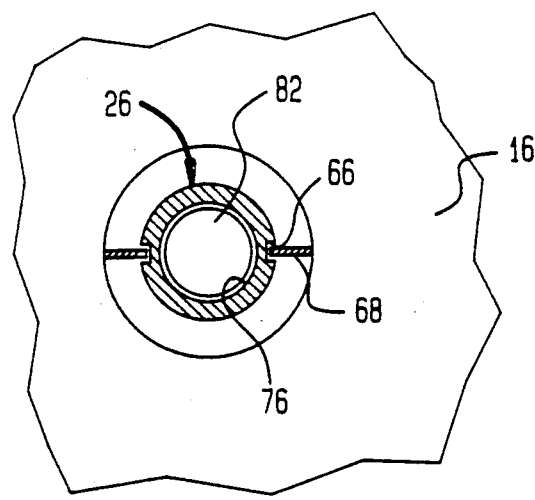
FIG. 5 is a transverse sectional view of the coupling means illustrated in FIG. 4 taken along line 5—5.

More specifically, in the embodiment of the invention illustrated in FIG. 3, the spindle 26 includes external, right-handed screw threads 64. And, as shown in FIGS. 4 and 5, the spindle 26 also includes a pair of longitudinally extending grooves 66 in the outer surface thereof, shown in dashed line in FIG. 3, and in more particularity in solid line in FIGS. 4 and 5. The housing 14, preferably includes a central opening at the base end 16 thereof which includes a pair of complementary stationary keys 68 disposed in the grooves 66, respectively, for preventing rotation of the spindle 26 while allowing translation thereof relative to the keys 68 in either the upward or downward direction. The turbine rotor 34 includes complementary internal screw threads 70 rotatably mating with the spindle external threads 64. The rotor 34 includes a tubular mounting flange 72 formed integrally therewith and radially outwardly from the internal threads 70 for conventionally rotatably mounting the turbine rotor 34 to the first and second stationary nozzles 42 and 46 by conventional bearings 74.

Accordingly, as the turbine rotor 34 is caused to rotate by the pressurized fluid 44 discharged from the turbine nozzles 42 and 46, and since it is prevented from axial movement by the bearings 74, the spindle 26 must translate parallel to the centerline axis 28. As the rotor rotates in the first direction 38, the spindle 26 is caused to translate downwardly for inserting the control rod 12 further into the core 104. As the rotor 34 rotates in the second direction 40, the spindle 26 is caused to translate upwardly for withdrawing the control rod 12 relative to the core 104.

Accordingly, the control rod 12 may be inserted into or withdrawn from the core 104 by clockwise and counterclockwise rotation of the turbine rotor 34 about the spindle 26. In the event of a scram operation, which requires insertion of the control rod 12 more quickly than can be obtained by rotating the rotor 34, the coupling means 32 may be actuated for ungripping the control rod 12 to allow it to drop by gravity to its fully inserted position within the core 104.

The coupling means 32 is illustrated in more particularity in FIGS. 3 and 4 and include the spindle 26 having a central bore 76, an inlet 78 at a top end 26b thereof, and an outlet 80 at the bottom end 26a thereof. A piston 82 is disposed in the bore 76 at the spindle bottom end 26a, and has a piston rod 82b extending downwardly from the piston 82 and through the outlet 80. A pair of opposing latch fingers 84 form a collet for gripping the control rod spherical end 12a, and are pivotally mounted to respective support flanges 86 extending downwardly from the spindle bottom end 26a. The fingers 84 are operatively connected to the piston rod 82b for gripping and ungripping the control rod 12 upon selective translation of the piston 82 and the rod 82b relative to the spindle bottom end 26a.

Referring again to FIG. 2 in conjunction with FIGS. 3 and 4, pressurizing means 88 are provided for providing a pressurized driving fluid 90 into the housing 14 through the inlet 22 for exerting a pressure force F against the top of the piston 82 for moving downwardly the piston 82, and, in turn, moving the piston rod 82b. The pressurizing means 88 are effective for providing the pressurized fluid 90 at a predetermined pressure greater than the pressure inside the vessel 102 for generating a differential pressure across the piston 82 in the downward direction. The pressurizing means 88 include a conventional fluid source 92 which may be deionized or demineralized water, or feedwater, which is compatible with the water 114 inside the vessel 102. A conventional, variable speed and output pump 94 is joined in flow communication between the fluid source 92 and a conventional accumulator 96 for storing the water. A conventional variable flow first valve 98 is joined in flow communication between the accumulator 96 and the CRDs 10 at the inlets 22 by a first supply conduit 132. A conventional electrical controller 134 is operatively connected to the pump 94 and the first valve 98 by electrical lines 134a and 134b, and conventionally controls the pressure and flow rate through the pump 94 and the variable opening of the first valve 98 for selectively channeling the pressurized fluid 90 as a portion of the water in the accumulator 96.

Referring again to FIG. 4, the piston rod 82b preferably has conical bottom end 82c, and the fingers 84 each has an inclined inner side surface 84a at the top end thereof which is complementary in shape to the rod conical end 82c so that downward translation of the rod conical end 82c wedges apart the finger top inner surfaces 84a to pivot the fingers 84 relative to the flanges 86 to bring together inner side surfaces 84b at the bottom end of the fingers 84 in gripping contact with the complementary shaped, spherical top end 12a of the control rod 12. Accordingly, application of the pressurized fluid 90 downwardly on the piston 82 urges the conical end 82c against the top inner surfaces 84a to grip the bottom inner surfaces 84b about the control rod spherical end 12a.

With the fingers 84 gripping the control rod spherical end 12a, the driving fluid 44 may be provided through respective ones of the first and second turbine nozzles 42 and 46 for selectively inserting or withdrawing the control rod 12 in the core 104.

Referring additionally to FIG. 2, the driving fluid 44 is also preferably a portion of the water contained in the accumulator 96, and a conventional second, variable flow, valve 136 is disposed in flow communication between the accumulator 96 and the valve inlets 62 of the CRDs 10 by a conventional second supply conduit 138. The second valve 136 is operatively connected to the controller 134 by an electrical line 134c, and the actuators 58 of the CRDs 10 are also operatively connected to the controller 134 by electrical lines 134d.

Accordingly, the controller 134 may selectively signal the second valve 136 to open and provide the driving fluid 44 for rotating the turbine rotor 34. The controller 134 also positions the valve body 60 by the actuator 58 for selectively channeling the driving fluid 44 to one or the other of the nozzles 42 and 46.

The driving fluid 44 is discharged from the turbine rotor 34 within the housing 14 and may be suitably channeled into the vessel 102 through the outlets 24 of the housing 14 disposed above and below the turbine rotor 34. Since the pressurized fluid 44 is circulating within the housing 14, and since the spindle 26 translates therein, the pressurizing means 88 preferably also include an annular plenum 140 disposed inside the housing 14 and suitably sealingly joined to the top end 20 thereof at the inlet 22 for receiving the pressurized fluid 90. The plenum 140 includes an outlet 140b at the bottom end thereof spaced relatively closely to the spindle 26 for providing a seal therewith, which allows only a small portion of the pressurized fluid 90 to leak therebetween. The pressurized fluid 90 is, therefore, channeled from the inlet 22 and into the plenum 140, wherein it flows into the spindle inlet 78 and through the bore 76 to the coupling means 32. Interruption of the pressurized fluid 90 by closing the first valve 98 allows the fingers 84, as illustrated in FIG. 4, to ungrip the control rod spherical end 12a for allowing the control rod 12 to drop by gravity into the core 104.

Figure 6:
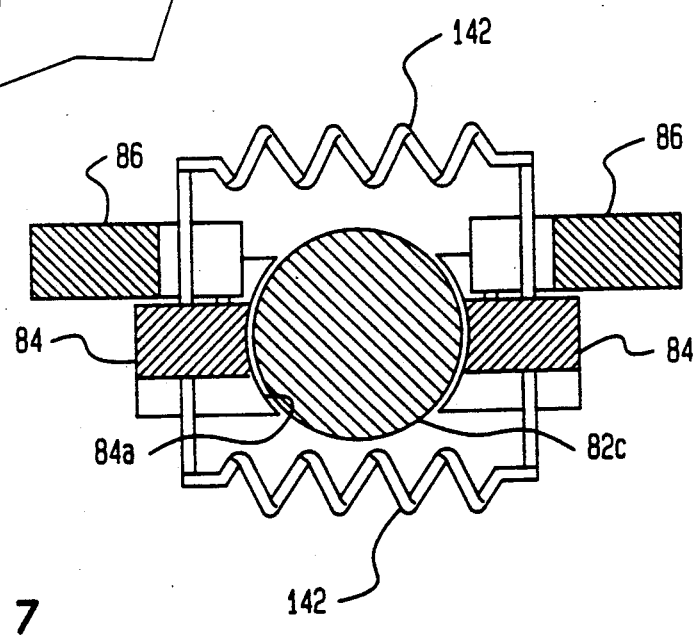
FIG. 6 is a transverse sectional view of the coupling means illustrated in FIG. 4 taken along line 6—6.
Figure 7:
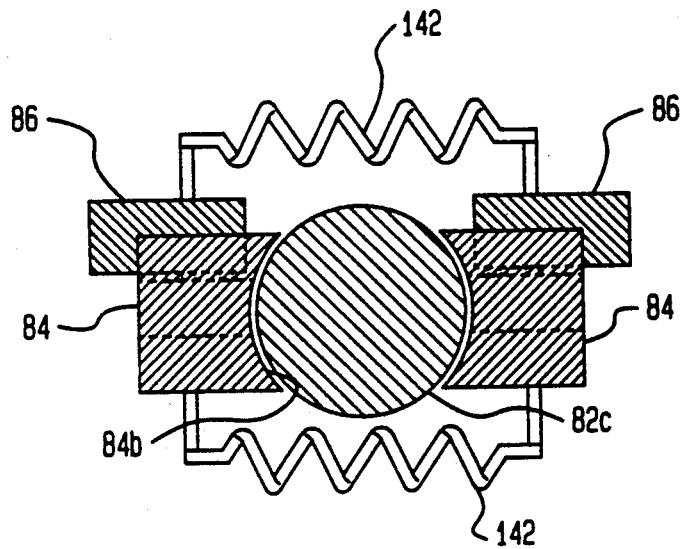
FIG. 7 is a transverse sectional view of the coupling means illustrated in FIG. 4 taken along line 7—7.

More specifically, and as illustrated in FIGS. 4, 6, and 7, at least one, and preferably a pair of return springs 142 are preferably mounted in tension between the top end of the fingers 84. A compression spring 144 is also preferably disposed between the lower surface of the piston 82 and the top surface of the spindle bottom end 26a to urge the piston 82, and in turn the piston rod 82b, upwardly in the spindle 26 upon interruption of the pressurized fluid 90 therein, as shown in dashed line in FIG. 4. The return springs 142 then urge together the top ends of the fingers 84, as shown in dashed line in FIG. 4, which in turn, urges apart the bottom ends of the fingers 84 to ungrip the control rod spherical end 12a from the bottom inner surfaces 84b of the fingers 84. The control rod 12 is then allowed to drop by gravity into its fully inserted position in the core 104.

In order to reconnect the fingers 84 with the control rod spherical end 12a, the turbine rotor 34 is rotated until the fingers 84 are lowered into the core 104 and around the control rod spherical end 12a. The pressurizing fluid 90 is then channeled against the piston 82 which moves downwardly to compress the spring 144 and wedge apart the top ends of the fingers 84 by the conical end 82c for bringing together the bottom inner surfaces 84b of the fingers 84 in gripping contact with the spherical end 12a. The control rod 12 may then be selectively withdrawn from the core 104 upon rotation of the turbine rotor 34 in the second direction 40.

As described above, and as represented schematically in FIG. 2, there are a substantial number of the CRDs 10, each of which may be operated independently of each other, or in groups of which may be operated in unison and independently of the remaining groups thereof. For example, an individual conduits 132 and 138, such as those illustrated in FIG. 2, may be provided for each of the CRDs 10 for obtaining independent operation of each CRD 10. However, it is more practical to group the CRDs 10 together, as represented schematically by the two CRDs 10 shown (in FIG. 2 which have a common first supply conduit 132 for operating the respective coupling means 32 in unison, and a common second supply conduit 138 for rotating the respective rotors 34 in unison. In such an embodiment, the respective inlets 22 and 62 are joined in parallel flow communication with the respective valves 98 and 136. By providing substantially identical configurations and sizes of the plurality of CRDs 10, the turbine rotors 34 thereof may be operated in unison for obtaining substantially identical withdrawal and insertion of the respective control rods 12. And, upon application or interruption of the differential pressure across the pistons 82, the coupling means 32 may also be operated in unison.

Illustrated in FIG. 8 is a CRD 10 in accordance with an alternate embodiment of the present invention. This embodiment of the present invention is substantially identical to the embodiment described above except that the turbine rotor, designated 34b does not include the internal threads 70 for mating with the spindle 26, but instead, includes a tubular shaft 146 fixedly joined to the turbine rotor 34b for coaxial rotation therewith, and rotatably joined to the housing 14 by the bearing 74 adjacent to the turbine rotor 34 and by a second bearing 74b in the top end 20 of the housing 14. The shaft 146 extends over the spindle 26 from the housing top end 20, through the turbine rotor 34b, and down to the base end 16. The shaft 146 includes internal screw threads 148 which are complementary in configuration to the external screw threads 64 on the spindle 26 and are disposed in rotatable engagement therewith so that rotation of the turbine rotor 34b and the shaft 146 causes the spindle 26 to translate in the same manner as described above.

In this embodiment, an annular plenum 150 is joined to the housing top end 20 outside of the housing 14, and includes the inlet 22 at the top end thereof, and an outlet 150b at the bottom thereof disposed around the top end of the shaft 146, with a conventional seal 152 provided therebetween for allowing, rotation of the shaft 146 while preventing excessive leakage of the pressurized fluid 90 from the plenum 150. The pressurized fluid 90 is channeled through the inlet 22, into the plenum 150, through the top end of the shaft 146, and into the spindle inlet 78 within the shaft 146. It is then channeled through the bore 76 to the coupling means 32 as described above for the first embodiment of the invention.

The CRDs 10 as described in both embodiments above are preferably mounted to the top of the core 104, and preferably to the top guide plate 18 along with the fuel bundles extending downwardly therefrom so that they may be installed and removed from the vessel 102 along with the fuel bundle to which they are mounted. Alternatively, the CRDs 10 may be mounted on any convenient internal components of the vessel 102 so that they may be removed separately from the fuel bundles.

The CRDs 10 in accordance with the present invention provide a considerable simplification relative to conventional control rod drives currently in use. They also eliminate the need for large penetrations of the pressure vessel 102, since only stationary and relatively small fluid conduits 132 and 138 are required for breaching the vessel 102. The CRDs 10 may also be preferably mounted above the core 104, thusly eliminating the conventional under vessel mounting configuration typically used in a boiling water reactor. The CRDs 10 may also be shorter than conventional control rod drives and when mounted above the core 104 as disclosed above, still allow room for the use of the conventional steam separator 108 and steam dryer 110 thereabove. Furthermore, gravity aided scram is an additional advantage of the top mounted CRDs 10 which is self effecting upon loss of the pressurized fluid 90 or power to the pump 94.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A drive for moving a control rod along a longitudinal axis in a reactor core disposed in a pressure vessel containing a pressurized fluid comprising:

a housing extending from said core;

a spindle disposed within said housing and mounted thereto for translation;

a turbine rotor operatively joined to said spindle within said housing for translating said spindle upon rotation of said rotor;

means for selectively rotating said turbine rotor in first and second opposite directions; and coupling means joined to an end of said spindle for selectively gripping said control rod for translation movement with said spindle for inserting and withdrawing said control rod into and from said core, and for ungripping said control rod.

2. A control rod drive according to claim 1 wherein said rotating means comprise a turbine nozzle, and further including a fluid conduit joined in flow communication with said turbine nozzle for selectively channeling a pressurized driving fluid through said nozzle and against said rotor for rotating said rotor to translate said spindle.

3. A control rod drive according to claim 2 wherein said rotating means further include:

a first nozzle configured relative to said rotor for channeling said driving fluid through said rotor for rotating said rotor in said first direction;

a second nozzle configured relative to said rotor for channeling said driving fluid through said rotor for rotating said rotor in said second direction;

a valve for selectively channeling said driving fluid to one of a first outlet and a second outlet thereof;

a first fluid conduit joined in flow communication with said first nozzle and said first valve outlet; and a second fluid conduit joined in flow communication with said second nozzle and said second valve outlet.

4. A control rod drive according to claim 3 wherein said coupling means comprise:

said spindle having a central bore, an inlet at a top end thereof, and an outlet at a bottom end thereof;

a piston disposed in said bore at said spindle bottom end and having a piston rod extending from said piston and downwardly through said outlet;

a pair of opposing latch fingers pivotally joined to said spindle bottom end and operatively connected to said piston rod for gripping and ungripping said control rod upon selective translation of said piston and rod relative to said spindle bottom end; and pressurizing means for selectively providing a pressurized fluid into said spindle bore through said spindle inlet for pushing said piston downwardly for causing said rod to pivot said fingers to grip said control rod, and for interrupting said pressurized fluid to allow said fingers to ungrip said control rod.

5. A control rod drive according to claim 4 wherein said piston rod has a bottom conical end, and said fingers have a top end with inclined inner surfaces being complementary in shape to said rod conical end so that downward translation of said rod wedges apart said finger top inner surfaces to bring together inner surfaces at a bottom end of said fingers in gripping contact with said control rod.

6. A control rod drive according to claim 5 further including a return spring joined between said finger top ends for urging together said top ends to urge apart said bottom ends to ungrip said control rod upon interruption of said pressurized fluid to said spindle bore.

7. A control rod drive according to claim 6 further including a compression spring disposed between said piston and said spindle bottom end to urge said piston, and in turn said piston rod, upwardly in said spindle upon interruption of said pressurized fluid therein.

8. A control rod drive according to claim 7 wherein said spindle includes:

external screw threads;

a pair of longitudinally extending grooves in the outer surface thereof; and said housing includes a pair of complementary stationary keys disposed in said grooves, respectively, for preventing rotation of said spindle while allowing translation thereof relative to said keys.

9. A control rod drive according to claim 8 wherein said turbine rotor includes internal screw threads rotatably mating with said spindle external threads, and said spindle is caused to translate as said turbine rotor rotates for inserting said spindle bottom end into said core upon rotation in said first direction, and withdrawing said spindle bottom end from said core upon rotation in said second direction.

10. A control rod drive according to claim 9 wherein said pressurizing means include an annular plenum joined to said housing, and having an inlet for receiving said pressurized fluid and an outlet for sealingly receiving said spindle top end, said pressurized fluid being channeled from said plenum, into said spindle inlet, and through said bore to said coupling means.

11. A control rod drive according to claim 8 further including a tubular shaft extending over said spindle, fixedly joined to said turbine rotor, rotatably joined to said housing, and having internal threads disposed in engagement with said spindle external threads so that rotation of said turbine rotor and shaft causes said spindle to translate.

12. A control rod drive according to claim 11 wherein said pressurizing means include an annular plenum joined to said housing, and having an inlet for receiving said pressurized fluid and an outlet for sealingly receiving a top end of said shaft, said pressurized fluid being channeled from said plenum, through said shaft, into said spindle inlet, and through said bore to said coupling means.

13. A control rod drive according to claim 8 wherein said housing extends upwardly from said core, said coupling means are joined to said spindle bottom end, and ungripping of said control rod by said coupling means allows gravity to insert said control rod into said core.

* * * * *